US012590873B2

(12) United States Patent
Troyke et al.

(10) Patent No.: US 12,590,873 B2
(45) Date of Patent: Mar. 31, 2026

(54) METHOD AND TESTING DEVICE FOR SIMULTANEOUSLY TESTING TWO ROTOR BLADES AND/OR TWO ROTOR BLADE SEGMENTS FOR A WIND POWER INSTALLATION

(71) Applicant: Wobben Properties GmbH, Aurich (DE)

(72) Inventors: Alexander Troyke, Berlin (DE); Falko Bürkner, Bremen (DE)

(73) Assignee: Wobben Properties GmbH, Aurich (DE)

( * ) Notice: Subject to any disclaimer, the term of this patent is extended or adjusted under 35 U.S.C. 154(b) by 421 days.

(21) Appl. No.: 18/175,734

(22) Filed: Feb. 28, 2023

(65) Prior Publication Data

US 2023/0280250 A1     Sep. 7, 2023

(30) Foreign Application Priority Data

Mar. 1, 2022     (DE) .......................... 102022104846.2

(51) Int. Cl.
*G01N 3/20*          (2006.01)
*F03D 17/00*        (2016.01)

(52) U.S. Cl.
CPC .............. *G01N 3/20* (2013.01); *F03D 17/00* (2016.05); *F05B 2260/83* (2013.01); *G01N 2203/0069* (2013.01)

(58) Field of Classification Search
None
See application file for complete search history.

(56) References Cited

U.S. PATENT DOCUMENTS 7,883,319 B2 *  2/2011  Volkmer ................. F03D 17/00
                                                          416/61
8,578,753 B2    11/2013  Schmaling et al.
                        (Continued)

FOREIGN PATENT DOCUMENTS

CN          102156040 A      8/2011
CN          203365124 U     12/2013
                    (Continued)

*Primary Examiner* — Peter J Macchiarolo
*Assistant Examiner* — Jermaine L Jenkins
(74) *Attorney, Agent, or Firm* — Seed Intellectual Property Law Group LLP

(57)          ABSTRACT

A testing device for simultaneously testing two rotor blades and/or two rotor blade segments for a wind power installation, to a method for simultaneously testing two rotor blades and/or two rotor blade segments for a wind power installation, to a method for testing a rotor blade and/or a rotor blade segment for a wind power installation, and to the use of a testing device for testing a rotor blade and/or a rotor blade segment for a wind power installation and/or for simultaneously testing two rotor blades and/or two rotor blade segments for a wind power installation. The testing device comprises a first adapter element for fastening thereto a first rotor blade or rotor blade segment, a second adapter element for fastening thereto a second rotor blade or rotor blade segment, a support structure to which the first and the second adapter element are fastened so as to be rotatable about a common rotation axis, an excitation device which is configured to apply a static and/or cyclic load to the first and/or the second rotor blade or rotor blade segment, wherein the first and the second adapter element are connected to each other.

17 Claims, 12 Drawing Sheets

(56) References Cited

U.S. PATENT DOCUMENTS

| 8,677,827 | B2 | 3/2014 | Cotrell et al. |
| 11,885,299 | B2 * | 1/2024 | Batge ...................... G01M 7/06 |
| 2010/0275695 | A1 | 11/2010 | Cotrell et al. |
| 2020/0132052 | A1 | 4/2020 | Schmid et al. |
| 2022/0010780 | A1 | 1/2022 | Batge et al. |

FOREIGN PATENT DOCUMENTS

| CN | 106762454 | A | 5/2017 |
| CN | 113790869 | A | 12/2021 |
| DE | 654009 | C | 12/1937 |
| DE | 102016117647 | A1 | 3/2018 |
| DE | 102018218515 | A1 | 4/2020 |
| EP | 3296715 | B1 | 9/2019 |

* cited by examiner

METHOD AND TESTING DEVICE FOR SIMULTANEOUSLY TESTING TWO ROTOR BLADES AND/OR TWO ROTOR BLADE SEGMENTS FOR A WIND POWER INSTALLATION

BACKGROUND

Technical Field

The invention relates to a testing device for simultaneously testing two rotor blades and/or two rotor blade segments for a wind power installation, to a method for simultaneously testing two rotor blades and/or two rotor blade segments for a wind power installation, to a method for testing a rotor blade and/or a rotor blade segment for a wind power installation, and to the use of a testing device for testing a rotor blade and/or a rotor blade segment for a wind power installation, and/or for simultaneously testing two rotor blades and/or two rotor blade segments for a wind power installation.

Description of the Related Art

The trend towards ever larger wind power installations with increasing nominal output also leads to ever larger or longer rotor blades. As the size or length increases, the rotor blades of larger wind power installations are also exposed to higher static and dynamic loads.

In the development of rotor blades for wind power installations, besides modelling the rotor blades, tests which comprise tests with static (extreme) loads as well as with cyclic or dynamic fatigue loads are often also required. In the process, the rotor blades are typically tested on test beds so as to establish whether their fatigue limit and/or their other properties are sufficient for the envisaged service life. The testing of rotor blades serves in particular also for checking whether the materials used in the blade, and the connection of said materials, are safe, reliable and capable of bearing loads (e.g., whether the (fiber) layers used in the production of a blade do not separate (i.e., delamination does not arise) or whether the load bearing capability of the spar caps is sufficient) and/or whether the blade does not break under repetitive and/or extreme loading.

These tests which are carried out prior to use and in particular prior to the start of mass production of rotor blades, may significantly delay and increase the cost of the implementation of a new rotor blade construction. A further challenge lies in that the testing equipment is also expensive in terms of procurement and operation, this likewise increasing the costs for the rotor blades and wind power installations. In particular, currently available test beds are not suitable for tests of rotor blades of a length of more than 70 m, more than 80 m, more than 90 m, or more than 100 m. An upgrade of current test beds with a view to testing rotor blades of a length of more than 70 m, more than 80 m, more than 90 m, or more than 100 m, if implementable in the first place, would lead to extremely high investment costs which would put in question the economic feasibility of the implementation. U.S. Pat. No. 8,677,827 B1 describes multi-axis degrees of freedom blade testing systems which utilize excitation of the base in order to enable more efficient fatigue testing of wind turbine blades. However, further improvements are desirable.

The German Patent and Trademark Office has researched the following prior art in the priority application for the present application: DE 10 2016 117 647 A1, DE 10 2018 218 515 A1, U.S. Pat. No. 8,677,827 B2.

BRIEF SUMMARY

Provided are techniques to an improved solution and/or a solution for a wider field of application, in particular for rotor blades of a length of more than 70 meters (m), more than 80 m, more than 90 m, or more than 100 m. Provided is an improved testing device for simultaneously testing two rotor blades and/or two rotor blade segments for a wind power installation, an improved method for simultaneously testing two rotor blades and/or two rotor blade segments for a wind power installation, an improved method for testing a rotor blade and/or a rotor blade segment for a wind power installation, and the use of a testing device for testing a rotor blade and/or a rotor blade segment for a wind power installation and/or for simultaneously testing two rotor blades and/or two rotor blade segments for a wind power installation.

Provided is a testing device for simultaneously testing two rotor blades and/or two rotor blade segments for a wind power installation, comprising a first adapter element for fastening thereto a first rotor blade or rotor blade segment; a second adapter element for fastening thereto a second rotor blade or rotor blade segment; a support structure to which the first and the second adapter element are fastened; an excitation device which is configured to apply a static and/or cyclic load to the first and/or the second rotor blade or rotor blade segment, wherein the first and the second adapter element are connected to each other.

As will yet be described, the support structure is preferably disposed on a foundation which may also be referred to as a test platform.

The two rotor blades and/or rotor blade segments are fastened to two adapter elements which in turn are connected to one another and to the support structure, in particular in an articulated manner. This testing device thus makes it possible for two rotor blades and/or rotor blade segments to be fastened to each other, in particular by way of a connection of the flanges thereof to the adapter elements and the connection of the adapter elements to each other, and for said two rotor blades and/or rotor blade segments to be conjointly tested. The arrangement described here can also be referred to as a "back-to-back arrangement" of two rotor blades (in particular in a row).

As a result of the mutual arrangement of the two rotor blades and/or rotor blade segments and the fastening thereof to each other, the majority of the loads arising in the support structure and/or in the foundation is therefore present during the testing operation only in the form of vertical forces and/or horizontal forces and no longer in the form of bending moments.

In the process, the rotor blades can be tested for fatigue using a preferably synchronous inherent frequency oscillation, as well as using quasi-static extreme loads.

Furthermore, using the solution described here, both indoor testing (e.g., in a shed) and outdoor testing (e.g., in the open) are possible. Furthermore, hybrid forms in which only part of the test setup, e.g., the testing device, is entirely or partially covered and/or protected in relation to meteorological influences are possible.

When testing the present rotor blades of a length of more than 70 m, more than 80 m, more than 90 m, or more than 100 m, entire rotor blades can be tested, or else rotor blade segments, wherein a rotor blade segment preferably comprises a region of 30% to 99%, preferably a region of at least 60% or at least 80%, of the overall length of the rotor blade, in particular proceeding from the blade root. The testing of rotor blade segments has the advantage of reducing the dimensions of the overall test setup and the flexing of the rotor blade segment (in particular at the tip), this leading to a lower required shed height (unless the test is carried out outdoors) and to a lower required excitation energy, because the air friction damping is much lower and also less expensive excitation devices can thus be used.

If mention is made of a rotor blade or rotor blades hereunder, this applies in an analogous manner also to a rotor blade segment or rotor blade segments.

The longitudinal axis of a rotor blade and/or of a rotor blade segment here is understood to be the blade axis that runs through the center of the ring-shaped blade flange in a direction orthogonal to the blade flange plane.

As a result of the rotor blades being connected to each other, the bending moments that arise during the test, in particular during the fatigue test, between the two rotor blades, in particular at the flange ends of the latter, can be largely cancelled or "shorted," respectively, and no longer have to be discharged by way of the support structure. This enables the support structure to be largely mounted free of moments, because substantially only vertical forces and/or horizontal forces still have to be transmitted, and the arising bending moments to be transmitted and directed into a foundation are reduced to a minimum, or at least significantly reduced. In this way, it is possible to reduce the test hardware required for the test bed and the required foundation to a minimum, this likewise meaning considerably lower investment costs.

The solution described here thus permits a testing device which can be implemented in a considerably more cost-effective manner and, therefore, means considerably lower investment costs. The investment costs for a testing device described here thus are only approximately 10-20%, and the time from planning to commissioning only approximately 50% of the investment costs and the time required with testing devices based on conventional testing methods.

One or more embodiments are based inter alia on the concept that the test setup to date, by fastening a rotor blade by way of the blade flange to a stiff steel or (steel-reinforced) concrete structure always means that the test bed is exposed to the full loads of the flange bending moments. The discharge of these bending moments into the foundation by way of the support structure, in combination with a cyclic fatigue loading, requires a very solid construction with high investment costs (in some instances with construction costs per test bed between €15-20 million) and a long construction period.

The testing device is preferably configured to test rotor blades and/or rotor blade segments in different directions, in particular in the flap-wise direction (deformation/load in the wind direction in the operation of the installation), and/or in the lead-lag-wise direction (deformation/load in the rotor plane (of the wind power installation)), and/or in the edge-wise direction and/or the flat-wise direction (these are the local direction (in terms of the radius of the rotor blade) corresponding to the axes relating to the aerodynamic system: edge-wise is the cord direction of the respective profile, while flat-wise is at 90° to the latter). The testing device is preferably configured for tests in the first and/or the second inherent mode of the rotor blade, or of the rotor blade segment, respectively, or of the rotor blades, or of the rotor blade segments, respectively, preferably in each case including conjointly oscillating components such as, for example, the load bracket, this preferably corresponding to the (preferably used) flap-wise and lead-lag-wise testing directions. These tests are preferably carried out sequentially, for example as two single-axis tests. In order to simulate the typical lifespan of a rotor blade, a fatigue test may include, for example, one million to ten million or more load or fatigue cycles which can take three to twelve months or longer for each direction tested. The testing device is preferably configured for a combined (simultaneous) flap-wise and lead-lag-wise direction.

The load exerted on the rotor blade in a specific direction can be time-invariant or static. Static loads are advantageous for evaluating the stiffness and resistance to breakage of the rotor blade. Alternatively, the load can vary over time; in this case, the load may be referred to as "cyclic." Cyclic loads are advantageous for evaluating the fatigue limit of the rotor blade.

The loads applied by way of the excitation device are typically applied in a first and a second direction and at a first and a second frequency, for example at different frequencies which may or may not correspond to the resonance frequencies or inherent frequencies, respectively, of the test specimen. The first and the second direction preferably run so as to be mutually transverse and can preferably be orthogonal.

Specifically when exciting the blade at the first or the second inherent frequency thereof in order to apply a fatigue load, the cyclic flange moments of very long blades become extremely high, as a result of which a very solid and thus expensive holding structure of the rotor blade becomes necessary, this leading to extraordinarily high investment costs, as has been mentioned. The testing device described here has considerable advantages in this respect.

In comparison to existing solutions, the lifting transverse force on the rotor blade flanges in the solution described here preferably also does not exceed, or does so only to a minor extent, the force of the dead weight of the support structure such that lifting is not to be anticipated, or can be prevented by slight ballasting, respectively.

According to a preferred embodiment it is provided that the first and the second adapter element are fastened to the support structure so as to be rotatable about a common rotation axis. The common the rotation axis, in particular during the testing operation, is preferably aligned so as to be substantially orthogonal to longitudinal axes of rotor blades and/or rotor blade segments that during the testing operation are fastened to the first and/or the second adapter element.

For example, the common rotation axis, in particular during the testing operation, can be aligned so as to be horizontal or vertical. Furthermore preferably, the common rotation axis can be configured so as to be adjustable, in particular adjustable between a horizontal position, in particular during the testing operation, and a vertical position, in particular during the testing operation.

This is particularly preferable in order to be able to carry out tests in different directions.

It is furthermore preferable that the support structure is configured to absorb lateral forces, in particular vertical forces and/or horizontal forces, and bending moments, wherein the ratio of the bending moments in kNm able to be absorbed by the support structure to the lateral forces in kN able to be absorbed by the support structure is preferably at most 15, in particular at most 10, at most 5, or at most 3.5.

According to a preferred embodiment, it is provided that the testing device comprises a foundation, wherein the foundation is configured to absorb lateral forces, in particular vertical forces and/or horizontal forces, and bending moments, wherein the ratio of the bending moments in kNm able to be absorbed by the support structure to the lateral forces in kN able to be absorbed by the support structure is preferably at most 15, in particular at most 10, at most 5, or at most 3.5.

It is furthermore preferable that the link between the support structure and the foundation is configured to absorb lateral forces, in particular vertical forces and/or horizontal forces, and bending moments, wherein the ratio of the bending moments in kNm able to be absorbed by the support structure to the lateral forces in kN able to be absorbed by the support structure is preferably at most 15, in particular at most 10, at most 5, or at most 3.5.

The testing device described here is mainly stressed with lateral forces, while the bending moments to be absorbed are heavily reduced in comparison to existing solutions, to approximately at most 10% of the bending moments arising in existing solutions. In contrast, the lateral forces to be absorbed by the testing device described here are approximately double in comparison to existing solutions. The absorption of lateral forces is however readily implementable both for the support structure and for the foundation or the link between the support structure and the foundation.

Loading of the support structure in cyclic (fatigue)
tests (stress resultants indicated as amplitudes) using
the solution according to the invention:

| Blade length [m] | Bending moment [kNm] | Lateral forces [kN] | Ratio Bending Moment [kNm]/ Lateral force [kN] |
|---|---|---|---|
| 35 | 500.0 | 300.0 | 1.7 |
| 70 | 1500.0 | 600.0 | 2.5 |
| 100 | 3000.0 | 1000.0 | 3.0 |
| 120 | 5000.0 | 1600.0 | 3.1 |

Loading of the support structure in static
(extreme load) tests using the solution
according to the invention:

| Blade length [m] | Bending moment [kNm] | Lateral forces [kN] | Ratio Bending Moment [kNm]/ Lateral force [kN] |
|---|---|---|---|
| 35 | 500.0 | 500.0 | 1.0 |
| 70 | 1700.0 | 1000.0 | 1.7 |
| 100 | 4500.0 | 1800.0 | 2.5 |
| 120 | 7000.0 | 2400.0 | 2.9 |

Loading of the support structure in cyclic
(fatigue) tests (stress resultants indicated
as amplitudes) in the prior art:

| Blade length [m] | Bending moment [kNm] | Lateral forces [kN] | Ratio Bending Moment [kNm]/ Lateral force [kN] |
|---|---|---|---|
| 35 | 5000.0 | 150.0 | 33.3 |
| 70 | 15000.0 | 300.0 | 50.0 |

-continued

Loading of the support structure in cyclic
(fatigue) tests (stress resultants indicated
as amplitudes) in the prior art:

| Blade length [m] | Bending moment [kNm] | Lateral forces [kN] | Ratio Bending Moment [kNm]/ Lateral force [kN] |
|---|---|---|---|
| 100 | 30000.0 | 500.0 | 60.0 |
| 120 | 50000.0 | 800.0 | 62.5 |

Loading of the support structure in static
(extreme load) tests in the prior art:

| Blade length [m] | Bending moment [kNm] | Lateral forces [kN] | Ratio Bending moment [kNm]/ Lateral force [kN] |
|---|---|---|---|
| 35 | 5000.0 | 250.0 | 20.0 |
| 70 | 17000.0 | 500.0 | 34.0 |
| 100 | 45000.0 | 900.0 | 50.0 |
| 120 | 70000.0 | 1200.0 | 58.3 |

In one preferred embodiment it is provided that the first and the second adapter element mutually include an angle of 0° to 40°, in particular of 0° to 10°. A preferred refinement is distinguished in that the first adapter element in relation to the vertical includes an angle of 0° to 20°, in particular of 0° to 5°, and/or the second adapter element in relation to the vertical includes an angle of 0° to 20°, in particular of 0° to 5°.

According to one preferred embodiment it is provided that the longitudinal axis of the first rotor blade or rotor blade segment and the longitudinal axis of the second rotor blade or rotor blade segment mutually include an angle of 180° to 140°, in particular of 180° to 170°. It is furthermore preferable that the longitudinal axis of the first rotor blade or rotor blade segment in relation to the horizontal includes an angle of 0° to 20°, in particular of 0° to 5°, and/or the longitudinal axis of the second rotor blade or rotor blade segment in relation to the horizontal includes an angle of 0° to 20°, in particular of 0° to 5°.

It is furthermore preferably provided that the first adapter element is configured as an adapter plate, and/or that the second adapter element is configured as an adapter plate. Plate-shaped adapter elements can be readily connected to the rotor blade flanges as well as to one another and to the support structure.

The first adapter element and the second adapter element are preferably connected directly to each other and to the support structure by ties. This enables a particularly simple solution having corresponding advantages in terms of costs.

Furthermore preferably, one, two or a plurality of spacers are disposed between the first and the second adapter element. The spacer or the spacers is/are configured as tubular spacer(s), for example, and/or configured to absorb high compressive forces.

According to one preferred embodiment it is provided that the testing device is configured so as to be able to be disassembled and/or transported. Therefore, the testing device can also be referred to as being mobile.

The solution described here, having relatively small and/ or light components in comparison to existing solutions, enables this design embodiment of the disassembling capability, transport capability or mobility. This is possible because the testing device by virtue of the low weight thereof can be transported between the testing sites and also only a comparatively simple foundation is required, the latter (as a flat, load-bearing capable hard ground) either already being available on site, or being able to be easily and rapidly provided on site.

This design embodiment capable of disassembly and/or transport has the advantage that the testing device can be transported to a production site, rather than the large rotor blades and/or rotor blade segments, often still in a prototype stage, being transported over long distances, this being complex and expensive. Furthermore, the rotor blades and/or rotor blade segments may be damaged during transport, this leading to correspondingly poorer test results and thus potentially putting in question a certification, or requiring a fresh test (associated with a correspondingly high input in terms of time and costs). The complex transports of rotor blades from the production site to the testbed could be dispensed with if the blade can be tested directly during production. Since the certification of the rotor blades in terms of time is very critical for the development of new installations, such long transport times are disadvantageous. Therefore, a great advantage of the solution described here is the possibility of testing rotor blades directly in the immediate vicinity of the production site and of thus saving time and costs for transportation.

Preferably, a plurality of the component parts of the testing device, in particular all component parts of the testing device, with the exception of the foundation, are able to be transported conjointly, for example in a standard container, in particular an ISO container (for example, a 40 ft ISO container) and/or on a motor truck, in particular a motor truck up to 40 t, and/or on a semitrailer, in particular a semitrailer having maximum external dimensions of 13.68 m×2.55 m×4.00 m.

The excitation device is preferably configured to simultaneously and/or identically excite both rotor blades and/or both rotor blade segments. This can be advantageous, for example in order to have more possibilities for adapting the load, for instance in a certification test.

The excitation device is likewise preferably configured to excite one of the two rotor blades and/or one of the two rotor blade segments. The excitation of one of the two rotor blades and/or both rotor blade segments and/or one of the two rotor blade segments can be sufficient in order to set both rotor blades and/or both rotor blade segments in vibration. Even when only one of the two rotor blades and/or one of the two rotor blade segments is excited, it can be preferable that the excitation device (or the components thereof) is connected to each of the two rotor blades and/or each of the two rotor blade segments so as to set the inherent frequencies of both rotor blades and/or both rotor blade segments as similarly as possible.

As will yet be further described, the testing device can also be utilized for testing only one rotor blade and/or one rotor blade segment. In this case, it can be advantageous for a counter element to be disposed on the second adapter element.

The excitation device can preferably have a control device or be connected to a control device, wherein the control device is preferably configured to control the excitation of the rotor blade and/or of the rotor blade segment and/or of the rotor blades and/or of the rotor blade segments. The control device preferably has a cut-out mechanism which is configured to vary the excitation and/or to terminate the latter, in particular if a critical state is exceeded, for example when a limit value in terms of the flexing of the rotor blades and/or of the rotor blade segments is reached or exceeded, or when an error arises in the control system.

In a further preferred embodiment it is provided that the excitation device comprises one or a plurality of actuators. The actuators can be configured so as to be hydraulic, for example in the form of hydraulic cylinders, and/or pneumatic and/or electric. When details are explained here using the example of a hydraulic excitation, said details, unless otherwise stated, likewise apply to a pneumatic and/or electric excitation.

The excitation device is furthermore preferably configured to identically excite the first and the second rotor blade or rotor blade segment, in particular in a synchronous manner and/or at the same frequency, preferably at the first or the second inherent frequency of the first and the second rotor blade or rotor blade segment. Provided to this end are preferably at least two actuators, in particular in the form of hydraulic and/or pneumatic and/or electric actuating drives, and furthermore preferably at least two controllers which can be integrated for example in the control device and/or in the actuators.

According to a further aspect, provided is a method for simultaneously testing two rotor blades and/or two rotor blade segments for a wind power installation, said method comprising the following steps: fastening a first rotor blade or rotor blade segment to a first adapter element; fastening a second rotor blade or rotor blade segment to a second adapter element; connecting the first and the second adapter elements to each other; disposing the first and the second adapter element on a support structure; applying a static and/or cyclic load to the first and/or the second rotor blade or rotor blade segment.

The method for simultaneously testing two rotor blades and/or two rotor blade segments for a wind power installation preferably comprises providing a testing device described above.

The method for simultaneously testing two rotor blades and/or two rotor blade segments for a wind power installation is preferably refined in that the first and/or the second rotor blade segment comprises a region of 30% to 99%, preferably a region of at least 60% or at least 80%, of the overall length of the rotor blade, in particular proceeding from the blade root.

The method for simultaneously testing two rotor blades and/or two rotor blade segments for a wind power installation is preferably refined in that the first and the second rotor blade or rotor blade segment are of a substantially identical configuration.

The method for simultaneously testing two rotor blades and/or two rotor blade segments for a wind power installation is preferably distinguished by applying in a synchronized manner a cyclic load to the first and the second rotor blade or rotor blade segment.

According to a further aspect, provided is a method for testing a rotor blade and/or a rotor blade segment for a wind power installation, said method comprising the following steps: fastening a first rotor blade or rotor blade segment to the first adapter element; disposing the first adapter element on a support structure; applying a static and/or cyclic load to the first rotor blade or rotor blade segment.

The method for testing a rotor blade and/or a rotor blade segment for a wind power installation preferably comprises providing a testing device described above.

The method for testing a rotor blade and/or rotor blade segment for a wind power installation is preferably refined in that the first rotor blade segment comprises a region of 30% to 99%, preferably a region of at least 60% or at least 80%, of the overall length of the rotor blade, in particular proceeding from the blade root.

The method for testing a rotor blade and/or a rotor blade segment for a wind power installation furthermore preferably comprises disposing a counter element, which may also be referred to as a counter oscillation element, on the second adapter element. The counter element is in particular configured in the form of a single mass oscillator which is preferably adjustable to the inherent frequency of the first rotor blade or rotor blade segment.

The method for simultaneously testing two rotor blades and/or two rotor blade segments for a wind power installation, and/or the method for testing a rotor blade and/or a rotor blade segment for a wind power installation is/are preferably distinguished by transporting a previously described testing device to the testing site, preferably in a disassembled form.

The method for simultaneously testing two rotor blades and/or two rotor blade segments for a wind power installation, and/or the method for testing a rotor blade and/or a rotor blade segment for a wind power installation is/are further preferably distinguished by providing a foundation at the testing site.

The method for simultaneously testing two rotor blades and/or two rotor blade segments for a wind power installation, and/or the method for testing a rotor blade and/or a rotor blade segment for a wind power installation is/are preferably distinguished by erecting the testing device at the testing site.

The method steps described here are preferably carried out in the sequence mentioned. Depending on the situation however, deviations from the sequence mentioned here are also possible within the context of technical feasibility.

According to a further aspect, provided is a use of a testing device described above for testing a rotor blade and/or a rotor blade segment for a wind power installation, and/or for simultaneously testing two rotor blades and/or two rotor blade segments for a wind power installation.

These methods described have features or method steps, respectively, which render said methods particularly suitable for use with a testing device described above and the refinements of the latter.

In terms of the advantages, preferred embodiments and details of the individual aspects and the preferred embodiments thereof, reference is likewise made to the corresponding advantages, preferred embodiments and details which are described with reference to the respective other aspects.

Further advantageous embodiments arise from the combination of individual, several or all of the preferred features described here.

BRIEF DESCRIPTION OF THE SEVERAL VIEWS OF THE DRAWINGS

Preferred exemplary embodiments will be described by way of example by means of the appended figures in which:

FIG. 2b shows an enlarged illustration of a detail from FIG. 2a;

FIG. 4b shows a schematic lateral view of the testing device according to FIG. 4a;

FIG. 4c shows an enlarged illustration of a detail from FIG. 4a;

In the figures, identical or substantially functionally equivalent elements are provided with the same reference signs. General descriptions typically refer to all embodiments unless differences are explicitly set forth.

DETAILED DESCRIPTION

Figure 1:
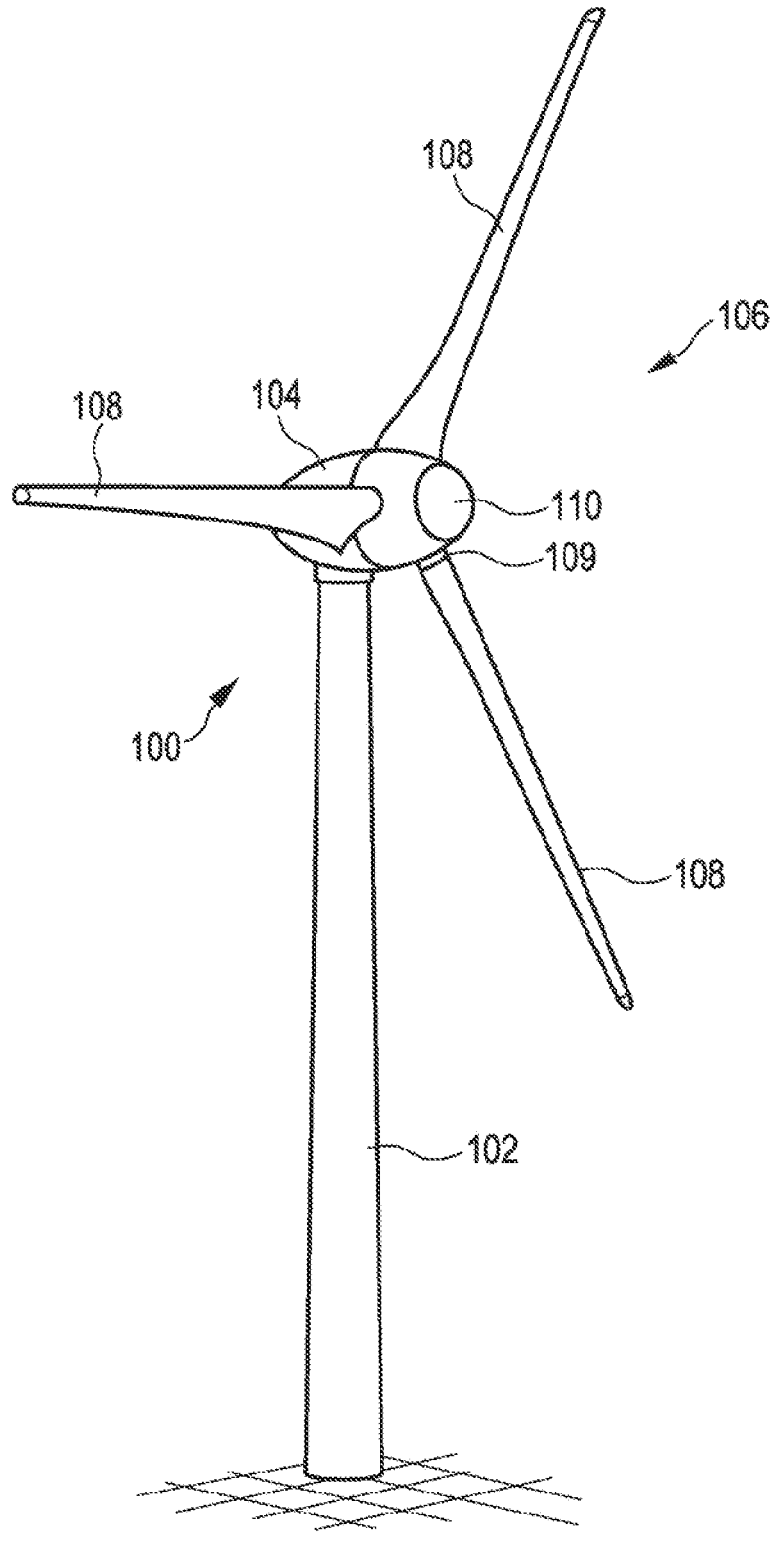
FIG. 1 shows a schematic illustration of a wind power installation.

FIG. 1 shows a schematic illustration of a wind power installation 100 in which rotor blades 108 are used. The wind power installation 100 has tower 102 and a nacelle 104 on the tower 102. An aerodynamic rotor 106 having three rotor blades 108 and a spinner 110 is provided on the nacelle 104. During the operation of the wind power installation the aerodynamic rotor 106 is set in a rotating movement by the wind, thus also rotating an electrodynamic rotor or rotor of a generator, which is coupled directly or indirectly to the aerodynamic rotor 106. The electric generator is disposed in the nacelle 104 and generates electric energy. The pitch angles of the rotor blades 108 can be varied by pitch motors on the rotor blade roots 109 of the respective rotor blades 108.

Figure 2A:
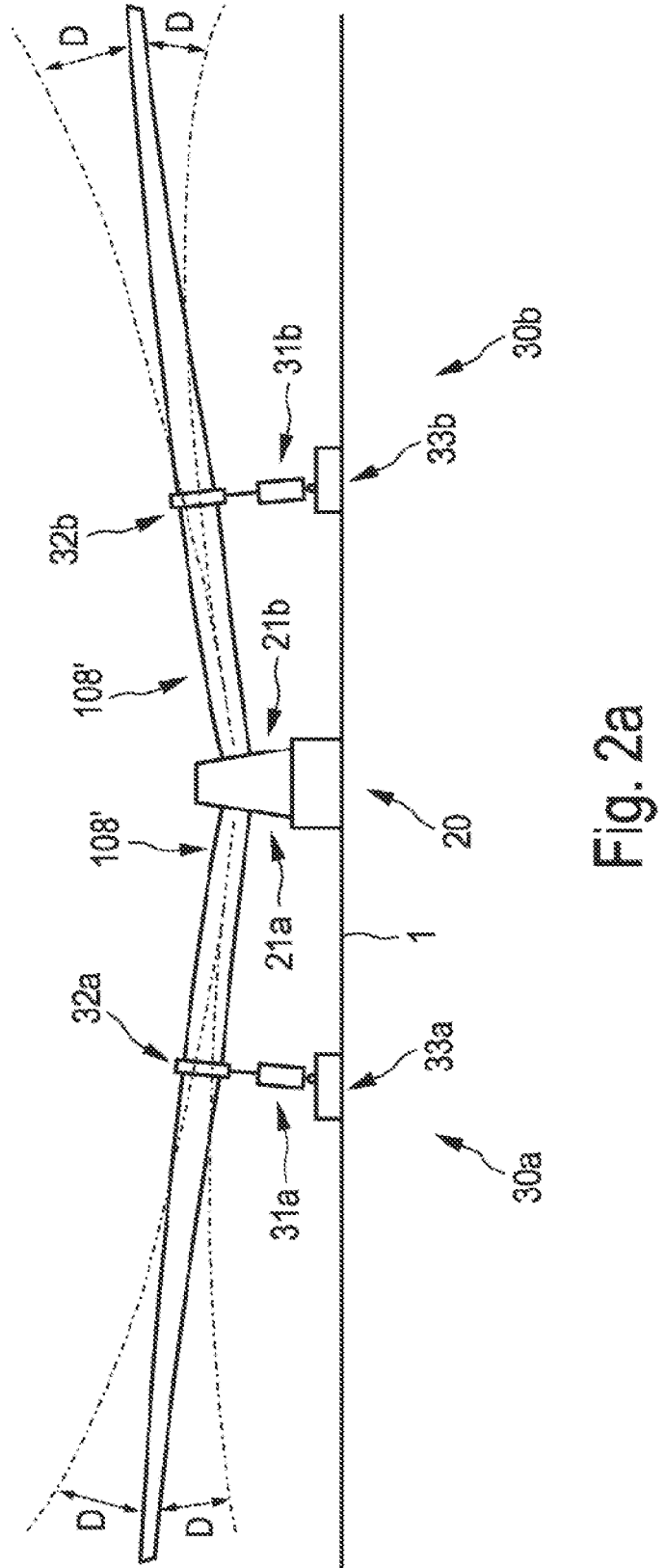
FIG. 2a shows a schematic illustration of an exemplary embodiment of a testing device for a fatigue test using two rotor blade segments.
Figure 3:
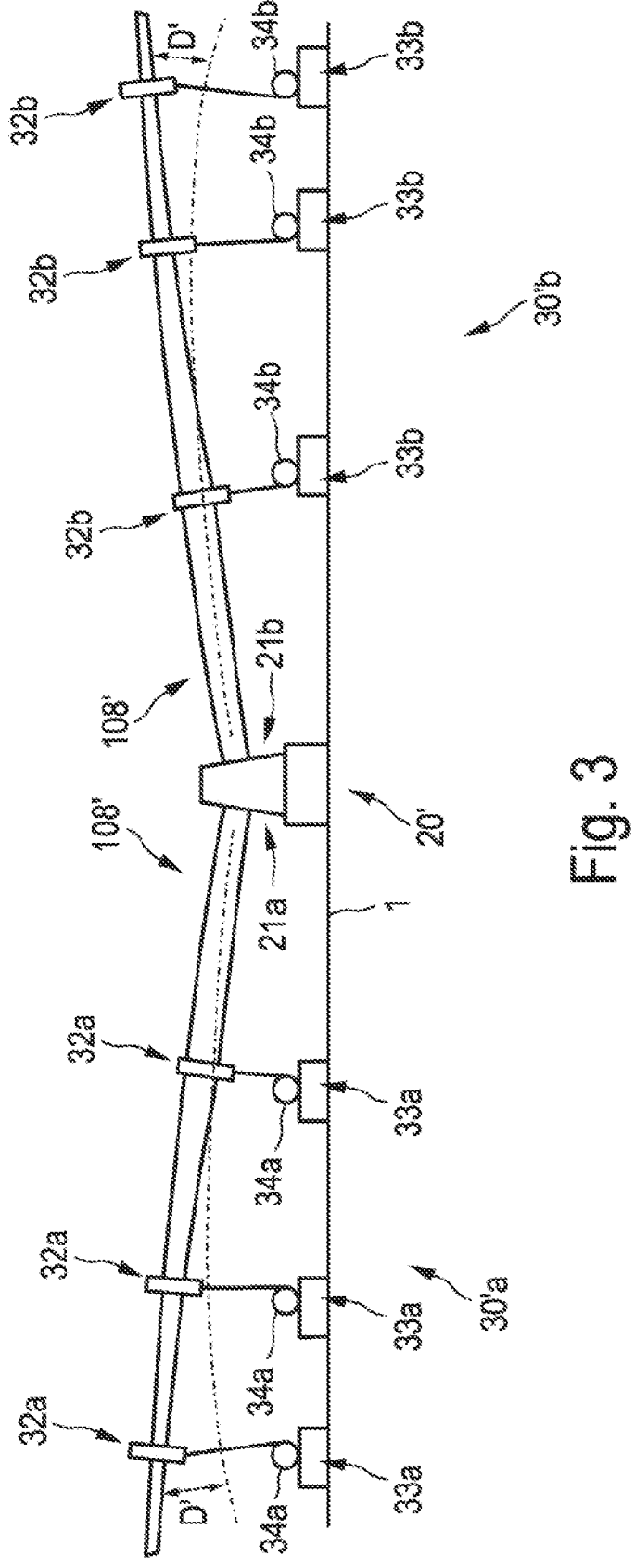
FIG. 3 shows a schematic illustration of an exemplary embodiment of a testing device for a static test using two rotor blades.

FIG. 2a shows a schematic illustration of an exemplary embodiment of a testing device 20 for a fatigue test using two rotor blade segments 108'. FIG. 3 shows a schematic illustration of an exemplary embodiment of a testing device 20' for a static test using two rotor blade segments 108'. The two testing devices 20, 20' differ from each other in particular in terms of the excitation devices 30a, 30b, 30'a, 30'b.

Both testing devices 20, 20' are disposed on a foundation 1 which may also be referred to as a test platform.

Both testing devices 20, 20' comprise in each case one first adapter element 21a in the form of an adapter plate, and a second adapter element 21b in the form of an adapter plate. The flanges of the rotor blade segments 108' are fastened, preferably screwed, to these adapter elements.

Figure 2B:
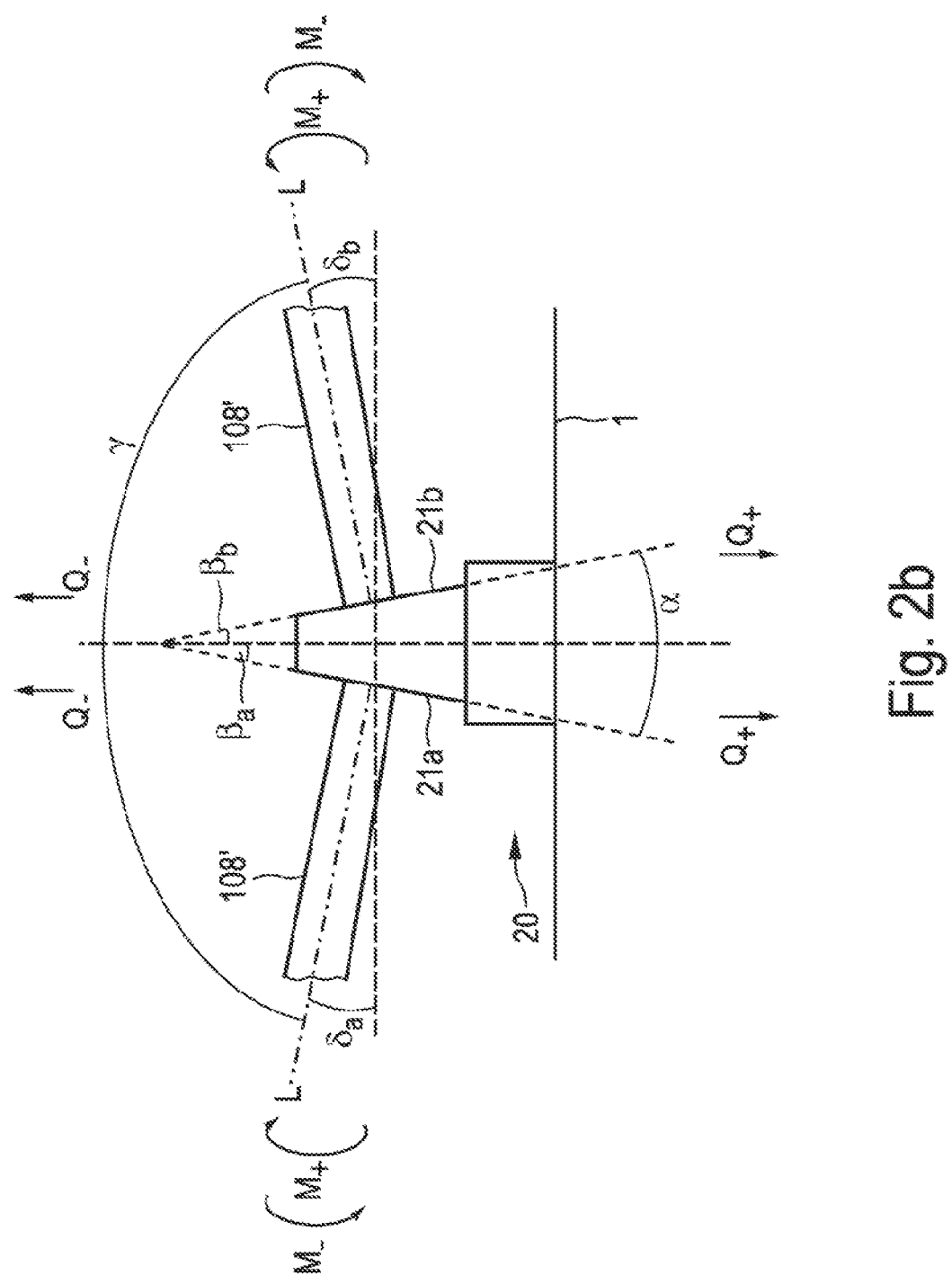

As can be seen in particular in FIG. 2b, the first and the second adapter element 21a, 21b mutually include an angle $\alpha$ of approx. 40°, wherein the first adapter element 21a in relation to the vertical includes an angle $\beta_a$ of approx. 20°, and the second adapter element 21b in relation to the vertical includes an angle $\beta_b$ of 0° to 20°.

Furthermore, the longitudinal axis L of the first rotor blade segment 108' and the longitudinal axis L of the second rotor blade segment 108' mutually include an angle $\gamma$ of approx. 140°. The longitudinal axis L of the first rotor blade segment in relation to the horizontal includes an angle $\delta_a$ of approx. 20°, and the longitudinal axis L of the second rotor blade segment in relation to the horizontal includes an angle $\delta_b$ of 0° to 20°.

The testing device 20 for a fatigue test using two rotor blade segments 108' according to FIG. 2a has an excitation device 30a, 30b, which comprises two sub-excitation devices. Each of the sub-excitation devices preferably comprises a load bracket 32a, 32b, an actuator 31a, 31b (for example in the form of a hydraulic actuating drive), and is disposed on a concrete block 33a, 33b. Like the foundation 1, the concrete blocks 33a, 33b, can be produced on site with little financial outlay. The sub-excitation devices, in particular the load brackets 32a, 32b, thereof, are fastened to the rotor blade segments 108' at a spacing from the blade root.

The excitation device 30a, 30b, is configured to excite the rotor blade segments 108' by way of cyclic fatigue loads and to set the rotor blade segments 108' in vibration, wherein upward as well as downward flexing D is created at the tip of the rotor blade segments 108'.

In such a fatigue experiment, a fatigue load is preferably applied by exciting the first or the second inherent frequency of the rotor blades and/or rotor blade segments (in particular in a flap-wise and/or lead-lag-wise test). A preferably synchronous excitation of the two rotor blades and/or rotor blade segments to the inherent frequency vibration in the vertical direction can take place, for example, by way of an excitation device 30a, 30b, in the form of hydraulic cylinders 31a, 31b, which are coupled by load brackets 32a, 32b.

In a static test as is illustrated in FIG. 3, the rotor blade segments 108' are tested in a quasi-static manner using extreme loads. To this end, an excitation device 30'a, 30'b, having a plurality of sub-excitation devices can be used. Each of the sub-excitation devices preferably comprises a load bracket 32a, 32b, an actuator 34a, 34b (for example in the form of an electric winch), and is disposed on a concrete block 33a, 33b. The rotor blade segments 108' are deflected downward by way of the actuators 34a, 34b. The concrete blocks 33a, 33b, can serve as counterweights. Here too, no bending moments, or no significant bending moments, have to be directed into the foundation. Only the vertical counter forces, or primarily the vertical counter forces, of the rotor blade segments 108' and of the test loads are to be directed into the foundation. The foundation 1 for such loads is relatively easy to install, just like the concrete blocks 33a, 33b.

Moreover, the directions of the arising lateral forces $Q_+$, $Q_-$ and bending moments $M_+$, $M_-$ are set forth in FIG. 2b.

In conventional rotor blade test beds according to the prior art, the bending moment applied to the blade flange has to be transmitted into the foundation and into the ground by way of the test bed construction. In the testing devices 20, 20' described here, the bending moment $M_+$, $M_-$ acting on the blade flange is absorbed directly by the second rotor blade or rotor blade segment, the latter being assembled "back-to-back" (or else "flange-to-flange"). In the solution described here, the support structure experiences no bending moment stress, or only an extremely low bending moment stress. Only moderate vertical fatigue loads, or primarily moderate vertical fatigue loads, in the form of lateral forces $Q_+$, $Q_-$ are to be handled. The solution described here, therefore, leads to a test bed for very large rotor blades and/or rotor blade segments at minimal investment costs.

Both testing devices 20, 20' according to FIGS. 2a and 3 are configured such that they excite rotor blades and/or rotor blade segments in a vertical direction. The testing devices 20, 20' can preferably also be configured such that they excite rotor blades and/or rotor blade segments in a horizontal direction. To this end, the testing devices 20, 20' can be configured so as to be correspondingly adjustable.

According to FIGS. 2a and 3, the flanges of the two rotor blade segments 108' are disposed "back-to-back", which may also be referred to as "shorting". As a result, the flange moments are cancelled directly between the two flanges. For this purpose, two identical rotor blades or rotor blade segments 108' are preferably used.

A schematic illustration of an exemplary embodiment of a testing device 200 for a fatigue test using two rotor blades is shown in FIGS. 4a-4f. Tests using two identical rotor blades 108 were carried out here.

The two rotor blades 108 by way of two adapter plates 121a, 121b, are connected to each other and to the support structure 210 by means of screw connections 215, 216. The adapter plates 121a, 121b, are screwed to one another ("back-to-back") by way of the swivel pin 214, which is mounted in an articulated manner, of the support structure 210. Spacers can preferably be disposed between the adapter plates 121a, 121b.

The support structure 210 by way of a foundation attachment 211 is disposed on a foundation 1 which during operation has to absorb almost only vertical loads.

The support structure 210 comprises two steel profiles 212, for example HEB profiles, which are substantially perpendicular during operation and are connected to each other by way of upper cross members 213o and a lower cross member 213u. Furthermore, the swivel pin 214, which is mounted in an articulated manner, connects the steel profiles 212.

The two adapter plates 121a, 121b, are suspended on the common swivel pin 214 so as to reinforce the effect that ideally no bending moment is transmitted to the support structure 210 and/or the foundation 1. The two adapter plates 121a, 121b, by way of ties 216 are connected directly to each other, and by way of ties 215 are connected to the support structure 210 by way of the pendulum elements 217 suspended on the swivel pin 214. The rotor blade flanges can be screwed to the adapter plates 121a, 121b, from the insides of the latter. The adapter plates 121a, 121b, are preferably mutually spaced apart.

Figure 4A:
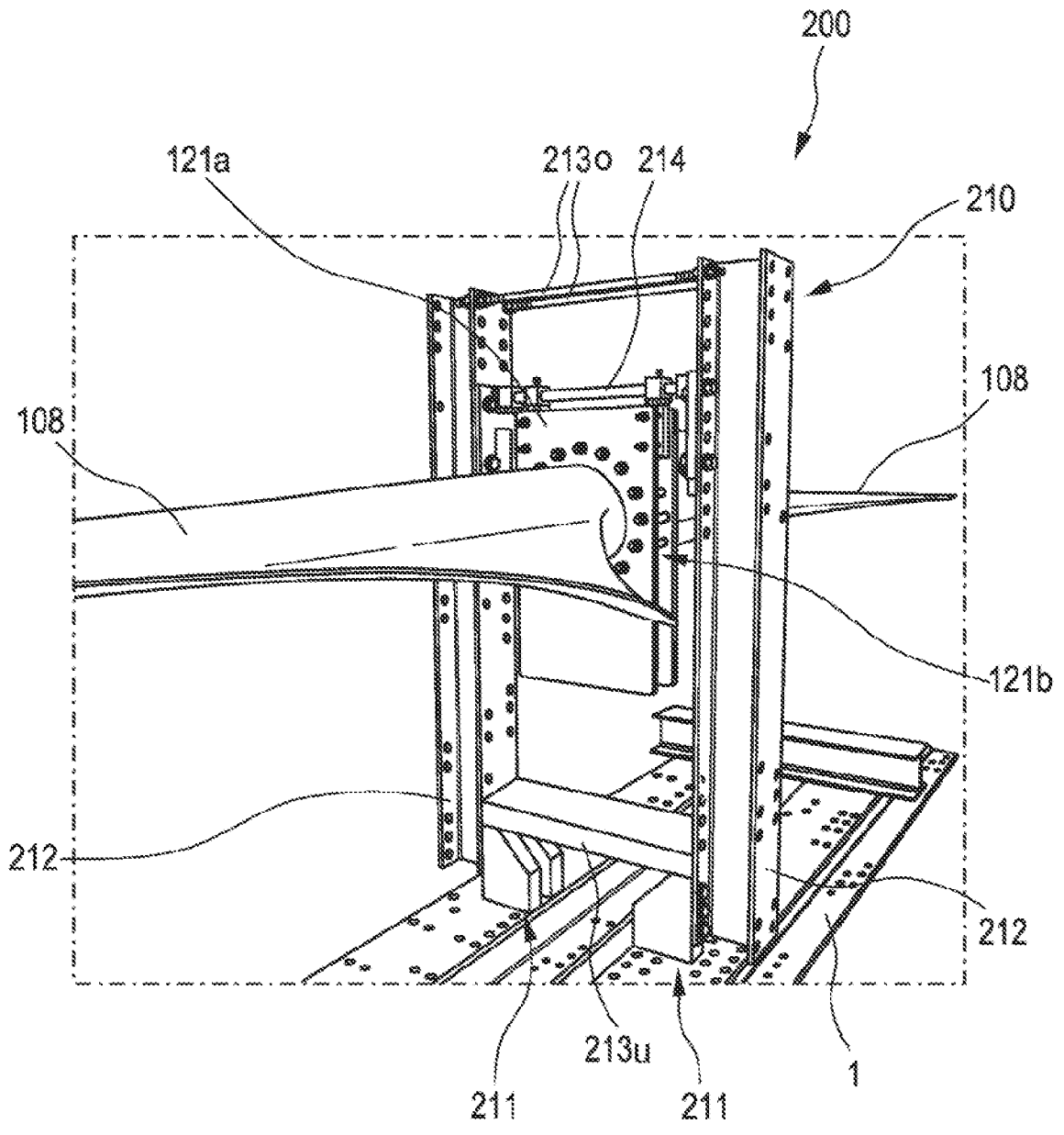
FIG. 4a shows a schematic three-dimensional view of an exemplary embodiment of a testing device for a fatigue test using two rotor blades.
Figure 4B:
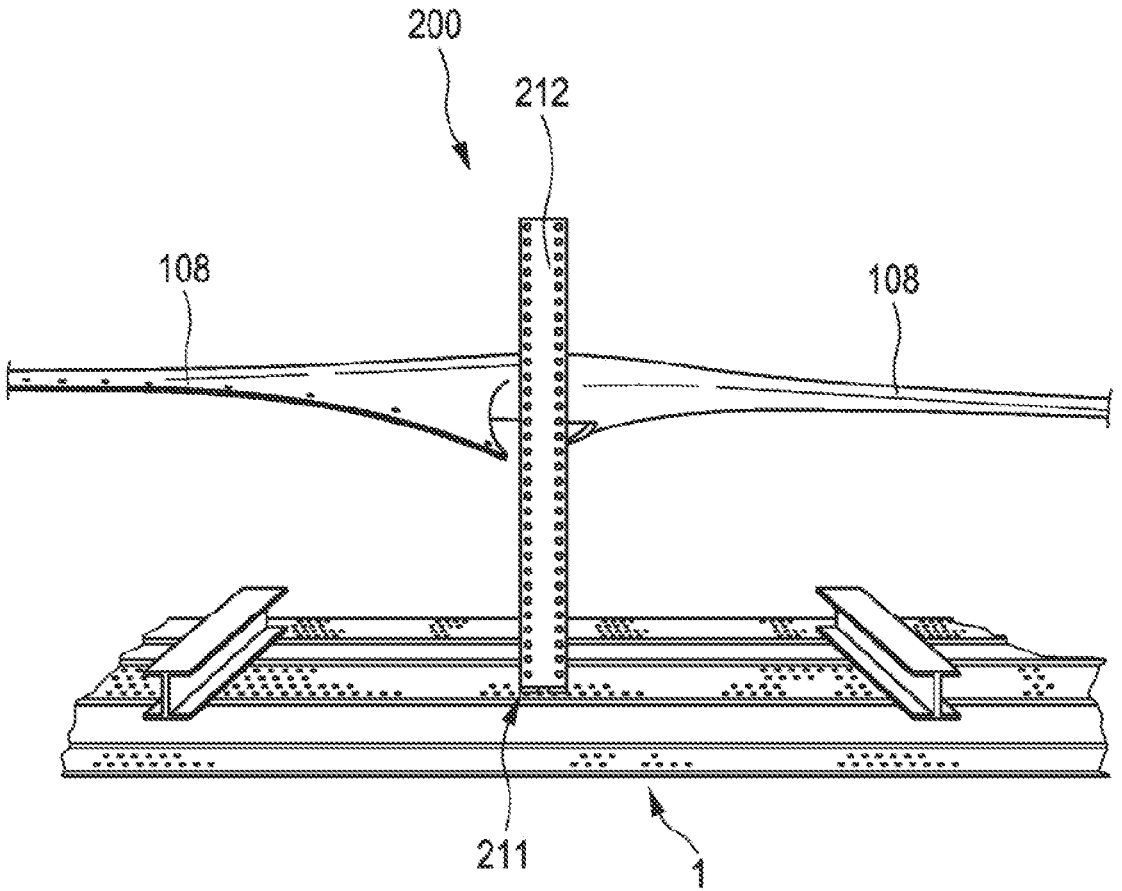
Figure 4C:
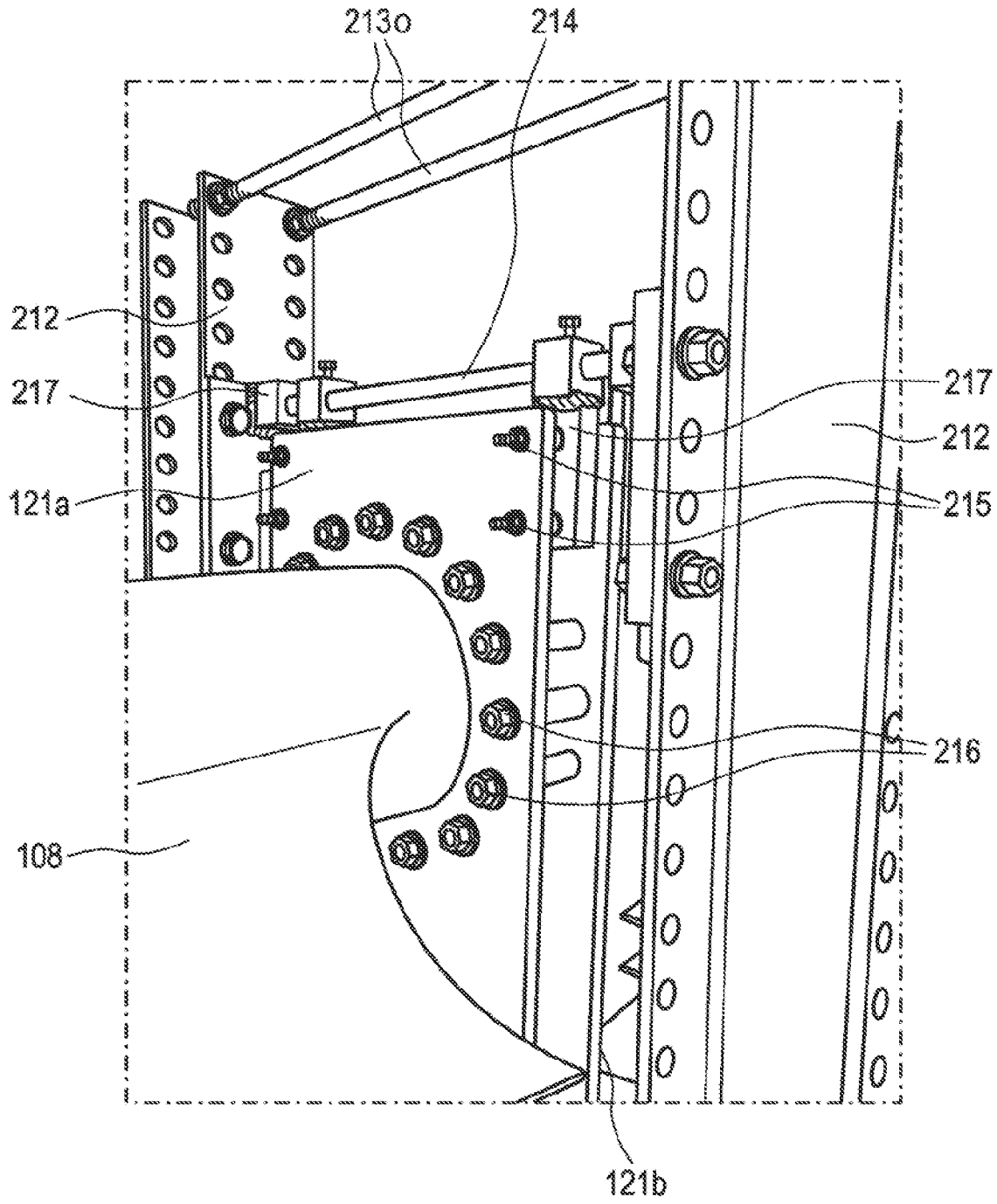
Figure 4D:
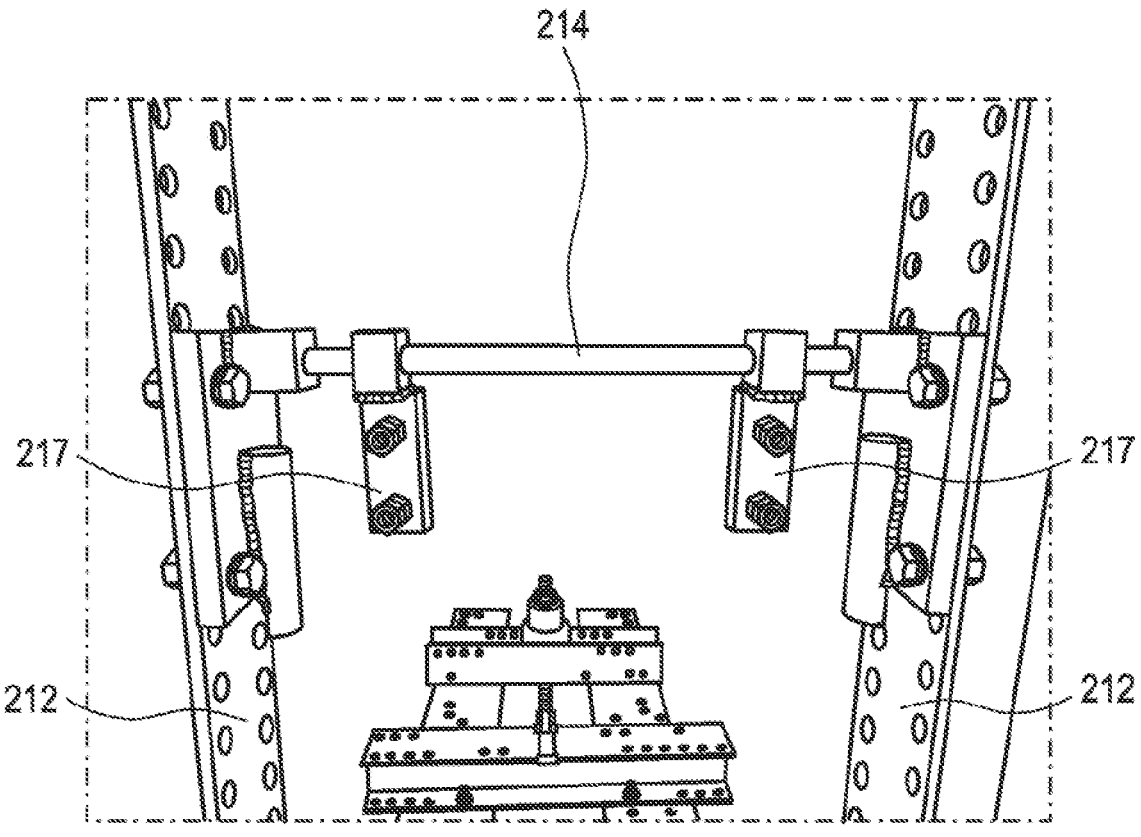
FIG. 4d shows an enlarged illustration of a detail of the testing device according to FIG. 4a, without adapter element and rotor blade.
Figure 4E:
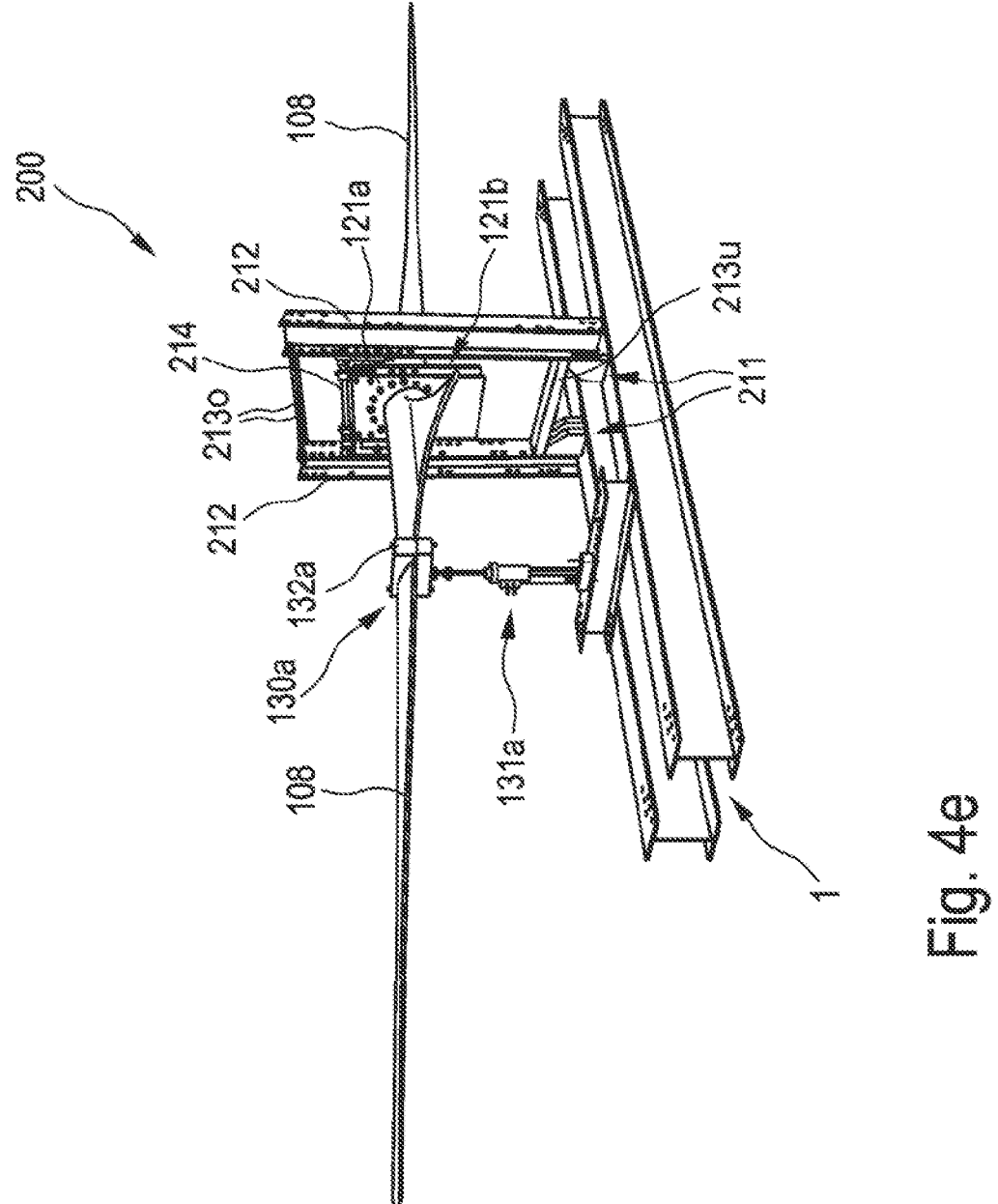
FIG. 4e shows a schematic three-dimensional view of the testing device according to FIG. 4a, having an excitation device.
Figure 4F:
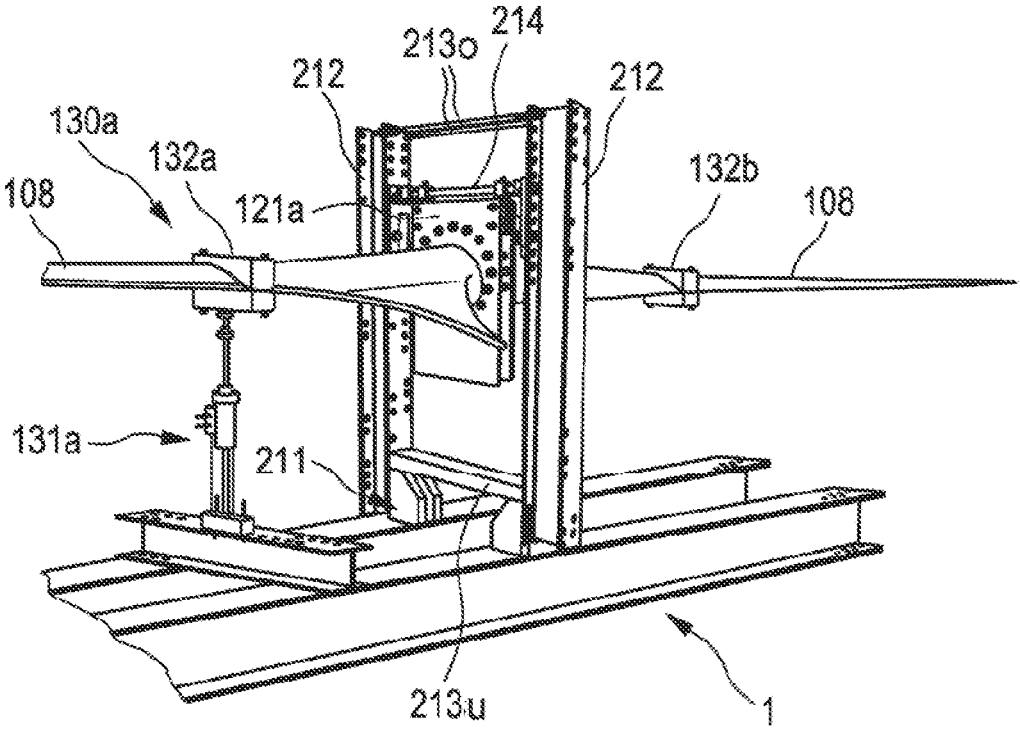
FIG. 4f shows an enlarged illustration of a detail of the testing device according to FIG. 4e.

The testing device 200 furthermore has an excitation device 130a, as can be seen in particular in FIGS. 4e and 4f. One load bracket 132a, 132b is disposed on each of the rotor blades 108, this being preferable when both rotor blades 108 are excited, but when exciting only one rotor blade 108 also has the advantage that the inherent frequencies of the two rotor blades can be adjusted as similarly as possible. Only one rotor blade 108 was excited in the test illustrated in FIGS. 4e and 4f. To this end, an actuator 131a is coupled to the load bracket 132a, in the example here a pneumatic actuator is coupled to the load bracket 132a and actuated so as to excite the rotor blades 108 at the first inherent frequency. The actuation of the actuator 131a takes place, for example, by way of a soft programmable controller which is integrated in a PMX measurement amplifier of HBM. When a further actuator is coupled to the second load bracket 132b, both rotor blades can also be directly excited simultaneously by the testing device 200. If only one rotor blade 108 is excited directly by way of an actuator, the second rotor blade oscillates conjointly by way of the direct coupling and the back-to-back arrangement of the two rotor blades.

In an experiment using one actuator, both rotor blades 108, when excited at their first inherent frequency, oscillated in a laterally reversed manner in relation to the adapter plates (see FIG. 4*e*).

In a test (not illustrated) using two actuators, both rotor blades 108 were excited by an actuator on each rotor blade. Both wings, when excited at their first inherent frequency, oscillated in a laterally reversed manner in relation to the adapter plate.

Furthermore, the inherent frequency can be changed, for example reduced, by attaching trimming weights, for example in the form of further load brackets, to the rotor blades 108. As a result, adapting the experiment setup to different testing frequencies can be easily performed.

Figure 5:
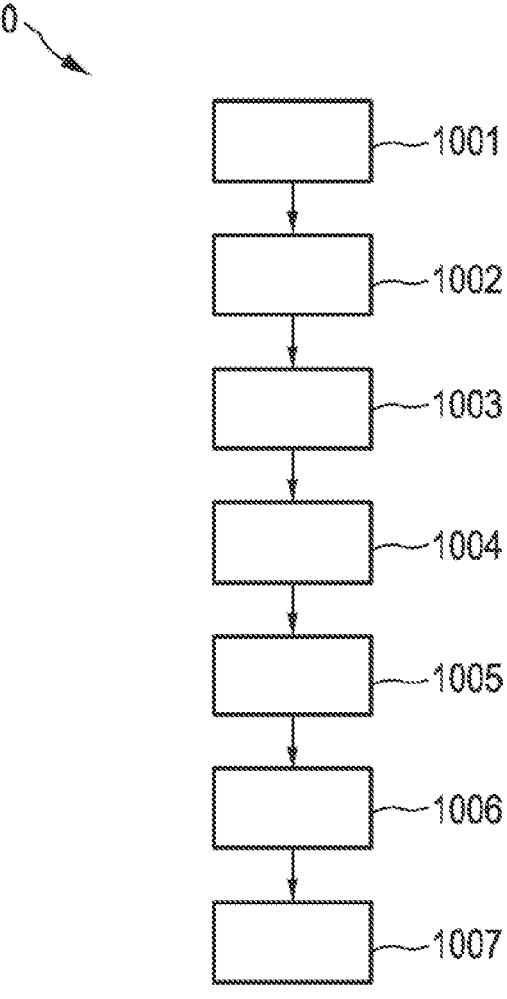
FIG. 5 shows a schematic flow chart of an exemplary embodiment of a method for simultaneously testing two rotor blades and/or two rotor blade segments for a wind power installation.

FIG. 5 shows a schematic flowchart of an exemplary embodiment of a method (1000) for simultaneously testing two rotor blades and/or two rotor blade segments for a wind power installation. In a step 1001, a testing device is preferably transported to the testing site, preferably in the disassembled form, and in a step 1002 is then preferably erected at the testing site. Furthermore preferably, a foundation is provided at the testing site if required.

In step 1003, a first rotor blade a rotor blade segment is fastened to a first adapter element. In step 1004, a second rotor blade or rotor blade segment is fastened to a second adapter element. In step 1005, the first and the second adapter element are connected to each other and, in step 1006, disposed on a support structure before, in step 1007, a static and/or cyclic load is applied to the first and/or the second rotor blade or rotor blade segment, wherein applying the cyclic load to the first and the second rotor blade or rotor blade segment can take place in a synchronous manner.

Figure 6:
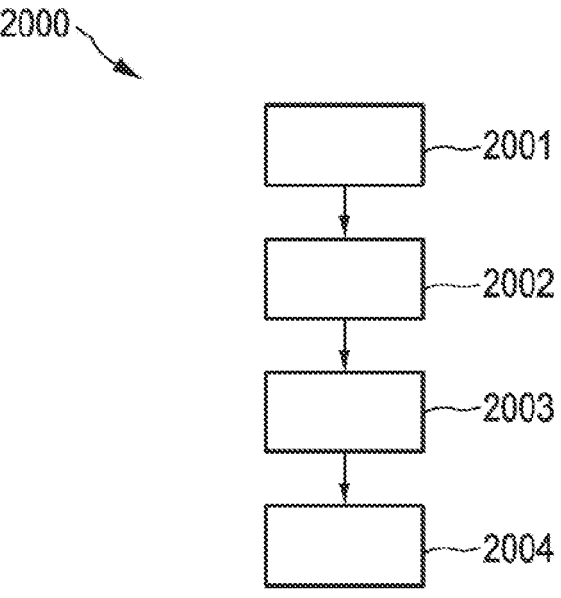
FIG. 6 shows a schematic flow chart of an exemplary embodiment of a method for testing a rotor blade and/or a rotor blade segment for a wind power installation.

FIG. 6 shows a schematic flowchart of an exemplary embodiment of a method (2000) for testing a rotor blade and/or a rotor blade segment for a wind power installation. In a step 2001, a first rotor blade or rotor blade segment is fastened to the first adapter element, and the first adapter element is disposed on a support structure in step 2002. It is furthermore preferable that, in step 2003, a counter element, in particular in the form of a single mass oscillator, which is preferably adjustable to the inherent frequency of the first rotor blade or rotor blade segment, is fastened to the second adapter element. In step 2004, a static and/or cyclic load is then applied to the first rotor blade or rotor blade segment.

The method steps described here are preferably carried out in the sequence mentioned. Depending on the situation, however, deviations from the sequence mentioned here are also possible within the context of technical feasibility.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A testing device for simultaneously testing two rotor blades and/or two rotor blade segments for a wind power installation, the testing device comprising:
a first adapter element configured for fastening to a first rotor blade or a first rotor blade segment;
a second adapter element configured for fastening to a second rotor blade or a rotor blade segment;
a support structure, the first and the second adapter elements fastened to the support structure;
an excitation device configured to apply at least one load chosen from a static load and cyclic load to the first and/or the second rotor blades or the first and/or second rotor blade segments;
wherein the first and the second adapter elements are connected to each other.

2. The testing device according to claim 1, wherein the first and the second adapter elements are fastened to the support structure so as to be rotatable about a common rotation axis, wherein the common rotation axis is aligned so as to be substantially orthogonal to longitudinal axes of first and second rotor blades and/or the first and second rotor blade segments that during the testing operation are fastened to the first and/or the second adapter elements.

3. The testing device according to claim 2, wherein the common rotation axis is aligned so as to be horizontal and/or vertical; and/or wherein the common rotation axis is configured so as to be adjustable between a horizontal position and a vertical position.

4. The testing device according to claim 1, wherein the support structure is configured to absorb lateral forces and bending moments, wherein a ratio of the bending moments in kNm able to be absorbed by the support structure to the lateral forces in kN able to be absorbed by the support structure is at most 15.

5. The testing device according to claim 1, comprising a foundation, wherein the foundation is configured to absorb lateral forces and bending moments, wherein a ratio of the bending moments in kNm able to be absorbed by the support structure to the lateral forces in kN able to be absorbed by the support structure is at most 15.

6. The testing device according to claim 1, wherein a link between the support structure and a foundation is configured to absorb lateral forces and bending moments, wherein a ratio of the bending moments in kNm able to be absorbed by the support structure to the lateral forces in kN able to be absorbed by the support structure is at most 15.

7. The testing device according to claim 1, wherein the first and the second adapter elements mutually include an angle of 0° to 40°, and/or
wherein the first adapter element in relation to a vertical includes an angle of 0° to 20° or 0° to 5°, and/or the second adapter element in relation to the vertical includes an angle of 0° to 20° or 0° to 5°.

8. The testing device according to claim 1, wherein the longitudinal axis of the first rotor blade or the first rotor blade segment and the longitudinal axis of the second rotor blade or the second rotor blade segment mutually include an angle of 180° to 140° or 180° to 170°; and/or
wherein the longitudinal axis of the first rotor blade or the first rotor blade segment in relation to the horizontal includes an angle of 0° to 20° or 0° to 5°, and/or the longitudinal axis of the second rotor blade or the second rotor blade segment in relation to the horizontal includes an angle of 0° to 20° or 0° to 5°.

9. The testing device according to claim 1, wherein the first and/or the second adapter elements are configured as an adapter plate, wherein the first adapter element and the second adapter element are connected directly to each other and to the support structure by ties, and/or wherein two or more spacers are disposed between the first and the second adapter element; and/or
wherein the excitation device comprises at least one actuator, wherein the excitation device is configured to identically excite the first and the second rotor blades or the first and second rotor blade segments in a synchronous manner and/or at a same frequency.

10. The testing device according to claim 1, wherein the testing device is configured to be able to be disassembled and transported, wherein a plurality of component parts of the testing device are configured to be transported conjointly in at least one of a container, an ISO container motor truck, a motor truck of up to 40 ton, a semitrailer or a semitrailer having maximum external dimensions of 13.68 m×2.55 m×4.00 m.

11. A method for testing a component of a wind power installation, said method comprising:

providing a testing device according to claim 1;

fastening the first rotor blade or the rotor blade segment to the first adapter element;

disposing the first adapter element on the support structure; and applying the at least one load chosen from a static load and a cyclic load to the first rotor blade or the rotor blade segment.

12. The method according to claim 11, wherein fastening comprises fastening the rotor blade segment to the first adapter element, wherein the rotor blade segment comprises a region of 30% to 99% of an overall length of the rotor blade.

13. The method according to claim 12, comprising disposing a counter element that is adjustable to an inherent frequency of the first rotor blade segment on a second adapter element.

14. A method comprising:

transporting a testing device according to claim 1 to a testing site, wherein transporting comprises transporting the testing device in a disassembled form;

providing a foundation at the testing site; and erecting the testing device at the testing site.

15. A use of a testing device according to claim 1 comprising:

simultaneously testing two rotor blades for a wind power installation, and/or simultaneously testing two rotor blades segments for the wind power installation.

16. A method for simultaneously testing first and second rotor blades or first and second rotor blade segments for a wind power installation, the method comprising:

fastening the first rotor blade or the first rotor blade segment to a first adapter element;

fastening the second rotor blade or the second rotor blade segment to a second adapter element;

connecting first and the second adapter elements to each other;

disposing the first and the second adapter elements on a support structure; and applying a static load and/or a cyclic load to the first and/or the second rotor blades or the first and/or second rotor blade segments.

17. The method according to claim 16, wherein the first and/or the second rotor blade segments comprises a region of 30% to 99%, of an overall length of the rotor blade; and/or wherein the first and the second rotor blades or the first and second rotor blade segments are of substantially identical configuration; and/or comprising applying in a synchronized manner a cyclic load to the first and the second rotor blades or the first and second rotor blade segments.

\* \* \* \* \*